United States Patent

Boldlehner

[19]

[11] Patent Number: 5,952,748
[45] Date of Patent: Sep. 14, 1999

[54] HIGH SPEED MOTOR WITH TWO-PHASE COOLING SYSTEM

[75] Inventor: Hans-Georg Boldlehner, Graz, Austria

[73] Assignee: Elin Motoren GmbH, Vienna, Austria

[21] Appl. No.: 08/750,799

[22] PCT Filed: Jun. 22, 1995

[86] PCT No.: PCT/AT95/00126

§ 371 Date: Dec. 20, 1996

§ 102(e) Date: Dec. 20, 1996

[87] PCT Pub. No.: WO96/00462

PCT Pub. Date: Jan. 4, 1996

[30] Foreign Application Priority Data

Jun. 23, 1994 [AT] Austria ................................ 1240/94

[51] Int. Cl.[6] .................................................. H02K 9/20
[52] U.S. Cl. .............................. 310/54; 310/52; 310/58; 310/59; 310/89
[58] Field of Search ............................... 310/54, 52, 55, 310/58, 59, 64, 65, 56, 57; 62/505, 197, 113, 115

[56] References Cited

U.S. PATENT DOCUMENTS

| | | | |
|---|---|---|---|
| 2,604,500 | 7/1952 | Koning | 171/252 |
| 3,388,559 | 6/1968 | Johnson | 62/242 |
| 3,407,623 | 10/1968 | Richardson et al. | 62/197 |
| 3,727,085 | 4/1973 | Goetz et al. | 310/54 |
| 3,805,101 | 4/1974 | Purman | 310/54 |
| 4,959,570 | 9/1990 | Nakamura et al. | 310/54 |
| 5,317,224 | 5/1994 | Ragaly | 310/58 |
| 5,509,463 | 4/1996 | Callaway, Sr. et al. | 165/46 |

FOREIGN PATENT DOCUMENTS

| | | | |
|---|---|---|---|
| 739678 | 8/1966 | Canada | 62/505 |
| 0306405 | of 1989 | European Pat. Off. | 310/52 |
| 2091722 | 1/1972 | France | 310/52 |
| 2165847 | 12/1971 | Germany | 310/52 |
| 259740 | 10/1989 | Japan | 310/52 |
| 1354247 | 6/1974 | United Kingdom | 310/52 |

OTHER PUBLICATIONS

Translation of Japanese Patent Application 01–259,740, Oct. 17, 1989.

*Primary Examiner*—Clayton LaBalle
*Assistant Examiner*—Karl Imayoshi Tamai
*Attorney, Agent, or Firm*—Greenblum & Bernstein P.L.C.

[57] ABSTRACT

The aim of the invention is to design a rotary electric machine, in particular a high-speed motor, whose cooling system ensures that the heat generated is eliminated without a non-uniform heat distribution building up in the motor. The motor has cooling ducts (5) in the stator (2), between the bundle of laminations (3) and the housing (4). Located on the housing (4) are connections (6) for the supply of the coolant and connections (7) for the discharge of the coolant. A two-phase mixture is used as the coolant for the housing. If the bundle of laminations (3) gives out heat uniformly in all directions, evaporation will take place continuously round the whole of the casing. The motor also has as second coolant circuit. Gaseous coolant is fed in through another set of connections (8) to cool the rotor. This gaseous coolant passes through ducts (9) in the bundle of laminations (3) and into the air gap (10) between the rotor (1) and the bundle of laminations (3). The motor is designed for use at a rating of about 230 kW in high-speed compressors turning at 18,000 rpm. It is designed to use the same coolant as the compressor, in particular a freon.

20 Claims, 1 Drawing Sheet

HIGH SPEED MOTOR WITH TWO-PHASE COOLING SYSTEM

CROSS REFERENCE TO RELATED APPLICATION

The present application claims priority under 35 U.S.C. § 119 of Austrian Patent Application No. A 1240/94, filed Jun. 23, 1994.

BACKGROUND OF THE INVENTION

1. Field of the Invention

The invention relates to a cooling system for an electrically rotating machine, in particular for a gearless three-phase asychronous high-speed motor, which has cooling conduits between the bundle of laminations and the housing as well as connections in the housing that are for the supply and discharge of the coolant.

2. Discussion of Background Information

High-speed motors with speeds greater than 10,000 rpm are a special subject in the motor field. The technical problems are enormous at such high speeds and increase exponentially with increasing speed and/or power.

The state of the art for this kind of high-speed machines, with speeds of up to 18,000 rpm and powers below 100 kW is the direct current technology. However, due to the enormous wear and tear on the brushes in long term operation, this technology is connected with high costs.

The control of critical whirling speed is one of the key aims in the development of high-speed motors. The smaller the bearing spacing is on the motor shaft, the easier it is to control the critical whirling speed. All other structural requirements must be subordinated to the demand for a motor shaft that is as short as possible. With the shortening of the bearing spacing, though, the motor becomes more compact and as a result, the cooling problems become disproportionately greater.

In actual practice, the structural length is normally determined based on the calculation of the critical whirling speed and the attempt is made to carry away the dissipated heat by means of particular steps. As a result, it is inevitable that the component temperature rises and one approaches the use limit of the materials employed.

SUMMARY OF THE INVENTION

The object of the invention is to produce an electrically rotating machine, in particular a high-speed motor, whose cooling assures the conveyance of dissipated heat.

Accordingly, the present invention may be directed to a high-speed motor having a housing and a bundle of laminations. The high-speed motor may also include a housing coolant including a two-phase mixture; a rotor coolant including a gaseous coolant; a rotor coolant inlet coupled to the housing; and a radial cooling conduit in the bundle of laminations conducting the rotor coolant from the rotor coolant inlet to a space between the rotor and the bundle of laminations.

In accordance with another feature of the present invention, the high-speed motor may further include at least one housing coolant outlet coupled to the housing and at least one rotor coolant outlet coupled to the housing. The housing may include a longitudinal axis and each of the housing coolant outlets and the rotor coolant outlets may be arranged in a line parallel to the longitudinal axis.

In accordance with a further feature of the present invention, the line may be located along an uppermost point of the housing.

In accordance with still another feature of the present invention, a housing coolant inlet may be located at a position approximately 120° from the line and the rotor coolant inlet may be located at a position approximately 90° from the line.

In accordance with yet another feature of the present invention, the housing coolant inlet and the rotor coolant inlet may be circumferentially spaced around a perimeter of the housing.

In accordance with still another feature of the present invention, the two-phase mixture may include a liquid-gas state of aggregation. Further, the housing coolant and the rotor coolant may include freon.

In accordance with a further feature of the present invention, the bundle of laminations may evaporate the housing coolant to provide continuous cooling around the inside of the housing.

In accordance with a still further feature of the present invention, a housing coolant inlet may be coupled to a bottom portion of the housing. Further, a housing coolant outlet may be coupled to the housing at a position circumferentially spaced from the housing coolant inlet. Still further, a rotor coolant outlet may be coupled to the housing at a position circumferentially spaced from the rotor coolant inlet.

In accordance with yet another feature of the present invention, a housing coolant outlet and a rotor coolant outlet may be coupled to the housing at a same circumferential position and at a different longitudinal position.

Other advantageous embodiments and features of the present invention may be ascertained by reviewing the following detailed description of the present invention and the accompanying figures.

BRIEF DESCRIPTION OF THE DRAWINGS

The present invention is further described in the detailed description which follows, in reference to the noted plurality of drawings by way of non-limiting examples of preferred embodiments of the present invention, in which like reference numerals represent similar parts throughout the several views of the drawings, and wherein.

DETAILED DESCRIPTION OF THE PREFERRED EMBODIMENTS

Figure 1:
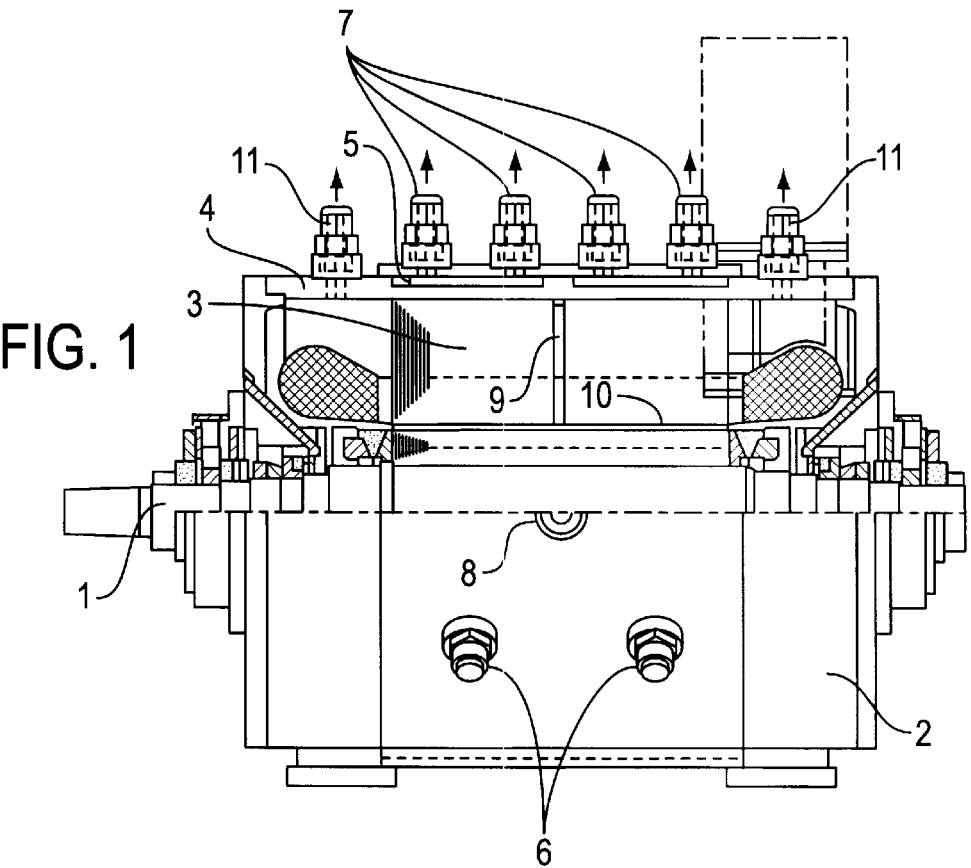
FIG. 1 illustrates a machine in partial section.
Figure 2:
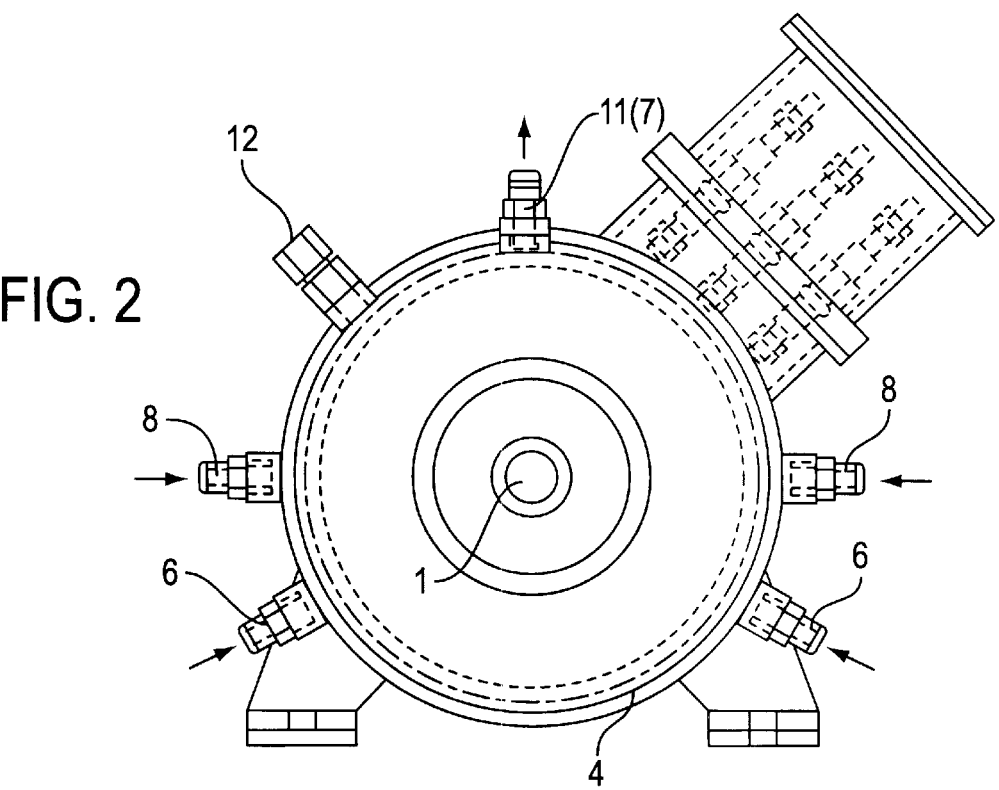
FIG. 2 illustrates the disposition of the connections along the circumference of the machine.

The electrically rotating machine according to the invention is characterized in that an organic refrigerant in the two-phase mixture, in particular in the liquid-gaseous state of aggregation is provided as the coolant, preferably FREON, and that a second coolant flow is provided via other connections disposed in the housing, that are for the supply and discharge of a coolant, wherein the coolant is an organic refrigerant in the gaseous state of aggregation, in particular FREON, and can be used for cooling the rotor via radial cooling conduits in the bundle of laminations.

With the invention, it is possible for the first time to drive high-speed compressors for refrigeration systems in a gearless manner, wherein no additional coolant is required for the electrical drive machine.

As is already known per se, refrigerants such as FREON 22 are used for the operation of refrigeration systems, which, because of its fluorocarbon hydrocarbon content, has now been replaced by FREON 134 a, which is a partially halogenated refrigerant.

Naturally, this coolant is also used for the cooling of the compressor.

It is in no way obvious, though, to use this coolant for the cooling of electrical machines. If one considers that freon has only approx. ⅕ the specific heat capacity of water, a shaft cooling makes practically no contribution to heat dissipation.

With the elimination of the shaft cooling, its advantages are also brought into question, such as a low bearing temperature and an even heat distribution over the shaft.

With the coolant guidance and cooling geometry according to the invention, though, the object of the invention is attained.

According to a particular feature of the invention, the two-phase mixture of the coolant has 60 to 70% liquid phase.

In particular the two-phase mixture of coolant for cooling the housing jacket has advantages. Assuming that the bundle of laminations gives off the heat evenly in all directions, a continuous evaporation occurs. Furthermore, though, it is also known that with a supply of heat, for example from the bundle of laminations, no change of the coolant temperature occurs, but rather the evaporation effect commences. I.e. the gaseous portion of the two-phase mixture increases and dissipates the heat.

The second coolant flow according to the invention assures the heat dissipation from the rotor region. Only gaseous coolant is used.

According to another feature of the invention, the connections for the supply and discharge of the coolant are disposed offset on the circumference of the housing. It should be noted that the greater the length of the cooling conduit, the more heat dissipation is achieved. A diametrically opposing disposition of the connections, though, is very difficult because of the construction of the machine, with its feet.

According to a particular embodiment of the invention, the connections for the discharge of the coolant are disposed at the zenith of the housing. It is advantageous that all connections for the discharge of the coolant are disposed in one plane. Furthermore, the discharge of the gaseous coolant is naturally favored at the highest point of the electrical machine.

According to a further feature of the invention, the connections for the supply of the two-phase mixture are disposed offset from the connections for the discharge by an angle of approximately +120°. A cooling geometry of this kind has demonstrated that the heat conveyance from the bundle of laminations is absolutely assured.

According to a particular embodiment of the invention, the connections for the supply of the gaseous coolant are disposed offset by an angle of +90° from the connections for the discharge, preferably in the horizontal plane of the motor. As a result, the temperature distribution of the second coolant flow is symmetrical to the temperature distribution of the housing coolant flow.

According to FIG. 1, a three-phase asynchronous motor for the highest speeds is shown with the rotor 1 and the stator 2. This motor is intended to drive high-speed compressors for refrigeration systems directly, that is, without gears, and is intended to reach speeds of 18,000 rpm at a power of approximately 230 kW. The same coolant used in the compressor is intended for use as a coolant for the motor.

A FREON is used as the coolant, also known under the trade name Frigen, which is a safety refrigerant according to Chemical Lexicon, 56 Römpp., starting at p. 1744. In principle, though, many organic refrigerants that have a low heat capacity in comparison to water can be used.

If one considers the high-speed motor with a power of 230 kW, at a desired efficiency of 92% at the rated load, then approximately 18 kW power loss must be carried away.

The motor dimensions are approximately a housing diameter of approx. 400 mm and a housing length of approx. 540 mm because of the critical whirling speed. The cited power loss of 18 kW is produced in this extremely compact motor. This is not only carried away with corresponding reliability, but also an uneven heat distribution with hot spots via individual components is not permitted to build up. Naturally, the permissible material temperatures cannot be exceeded.

The motor has cooling conduits 5 in the stator 2 between the bundle of laminations 3 and the housing 4. In the housing 4, connections 6 are provided for the coolant supply and connections 7 are provided for the coolant discharge. The coolant is introduced in a two-phase mixture with a pressure of approximately 2.7 bar for the cooling of the housing jacket.

If the bundle of laminations 3 now gives off the heat in all directions, then this produces a continuous evaporation. The gaseous coolant is then aspirated at the connections 7.

Furthermore, the high-speed motor has a second coolant flow. For the rotor cooling, gaseous coolant is introduced via the connections 8 with a pressure of approximately 2.7 bar. By means of the cooling conduits 9 for the bundle of laminations 3, this gaseous coolant is conducted into the air gap 10 between rotor 1 and bundle of laminations 3. This coolant is carried away via the connections 11.

The coolant temperature can be detected via a temperature sensor 12. Because of this, the machine temperature can be determined in a very sure manner.

The disposition of the connections 7 or 11 at the zenith of the machine as well as the disposition of the connections 6 or 8 at an angle of 120° or 90° for the coolant supply also mathematically produces a favorable cooling geometry.

I claim:

1. A cooling system for a gearless three-phase asynchronous high-speed motor having a bundle of laminations and a housing, the cooling system comprising:

at least one cooling conduit located between the bundle of laminations and the housing;

a first connection located in the housing supplying a first coolant comprising a two-phase mixture;

a second connection located in the housing discharging the first coolant;

a third connection located in the housing to provide a supply for a second coolant flow; and a fourth connection located in the housing to provide a discharge of the second coolant flow;

at least one radial cooling conduit positioned in the bundle of laminations;

the second coolant flow, comprising a second coolant in a gaseous state of aggregation, coupled to the at least one radial cooling conduit for cooling a rotor; and the housing having a longitudinal axis with each of the second connection and fourth connection being collinearly arranged parallel to the longitudinal axis.

2. The cooling system according to claim 1, the two-phase mixture of the coolant comprising approximately a 60 to 70% liquid phase.

3. The cooling system according to claim 1, each of the first, third, and fourth connections being circumferentially offset from each other around a circumference of the housing.

4. The cooling system according to claim 1, the second and fourth connections being aligned along a zenith of the housing.

5. The cooling system according to claim 1, the first connection being circumferentially offset from the second and fourth connections by an angle of approximately 120°.

6. The cooling system according to claim 1, the third connection being circumferentially offset from the fourth connection by an angle of approximately 90°.

7. The cooling system according to claim 6, the third connection located approximately within a horizontal plane comprising an axis of the rotor.

8. The cooling system according to claim 1, the first coolant comprising a liquid-gaseous state of aggregation.

9. The cooling system according to claim 1, the first coolant comprising FREON, and the second coolant comprising FREON.

10. A high-speed motor having a housing and a bundle of laminations, the high-speed motor further comprising:
   a housing coolant comprising a two-phase mixture;
   a rotor coolant comprising a gaseous coolant;
   a rotor coolant inlet coupled to the housing;
   a radial coolant conduit in the bundle of laminations conducting the rotor coolant from the rotor coolant inlet to a space between a rotor and the bundle of laminations;
   at least one housing coolant outlet coupled to the housing;
   at least one rotor coolant outlet coupled to the housing; and
   the housing having a longitudinal axis with each of the at least one housing coolant outlet and the at least one rotor cooling outlet collinearly arranged parallel to the longitudinal axis.

11. The high-speed motor according to claim 10, the line located along an uppermost point of the housing.

12. The high-speed motor according to claim 11, further comprising a housing coolant inlet located at a position approximately 120° from the line; and
   the rotor coolant inlet located at a position approximately 90° from the line.

13. The high-speed motor according to claim 10, the housing coolant inlet and the rotor coolant inlet being circumferentially spaced around a perimeter of the housing.

14. The high-speed motor according to claim 10, the two-phase mixture comprising a liquid-gas state of aggregation.

15. The high-speed motor according to claim 14, the housing coolant and the rotor coolant comprising freon.

16. The high-speed motor according to claim 10, the bundle of laminations evaporating the housing coolant to provide continuous cooling around the inside of the housing.

17. The high-speed motor according to claim 10, further comprising a housing coolant inlet coupled to a bottom portion of the housing.

18. The high-speed motor according to claim 17, further comprising a housing coolant outlet coupled to the housing at a position circumferentially spaced from the housing coolant inlet.

19. The high-speed motor according to claim 17, further comprising a rotor coolant outlet coupled to the housing at a position circumferentially spaced from the rotor coolant inlet.

20. The high-speed motor according to claim 10, further comprising a housing coolant outlet and a rotor coolant outlet coupled to the housing at a same circumferential position and at a different longitudinal position.

* * * * *